June 21, 1938. G. G. MERCHEN 2,121,486
HOPPER AND AGITATOR
Filed Jan. 22, 1937
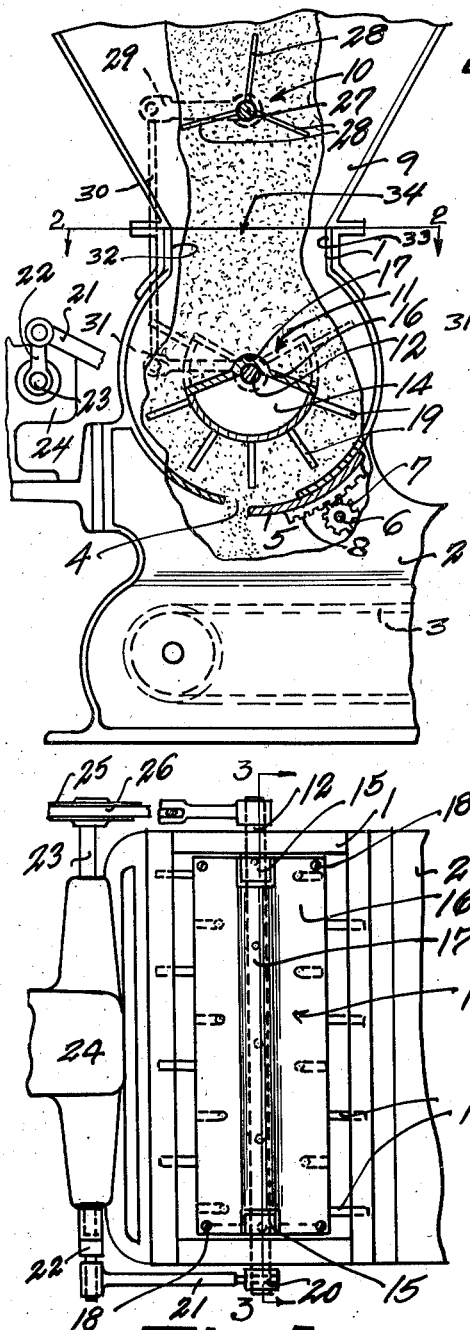
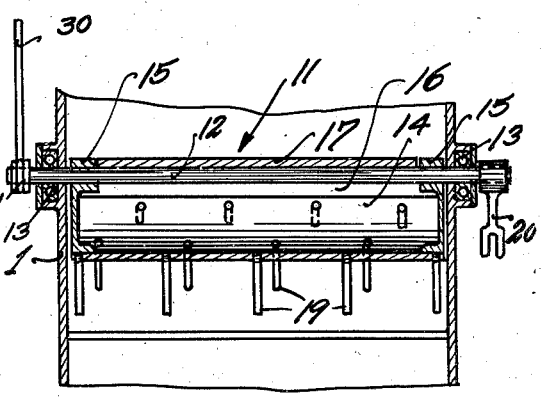
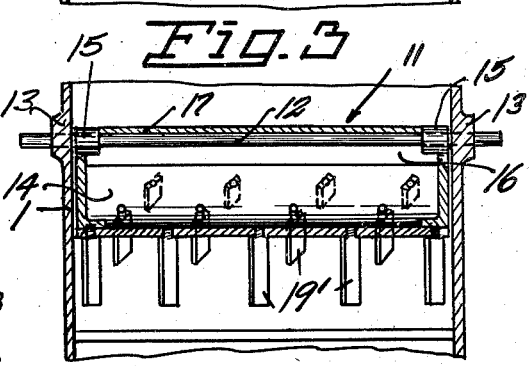
INVENTOR.
Glen G. Merchen
BY
ATTORNEY.

Patented June 21, 1938

2,121,486

UNITED STATES PATENT OFFICE 2,121,486

HOPPER AND AGITATOR

Glen G. Merchen, Spokane, Wash.

Application January 22, 1937, Serial No. 121,795

3 Claims. (Cl. 259—20)

This invention relates to an improved hopper and agitator of the type used in connection with a grain weighing scale such as illustrated in my copending application, Serial No. 22,641, filed May 21, 1935, patented July 27, 1937, No. 2,088,334 but it is to be understood that the hopper and improved agitating mechanism may be used for feeding powdered or ground material in any other mechanism desired and that the invention is not limited to the feeding of grain, flour or the like to a scale.

One object of the invention is to provide the hopper with agitating mechanism so constructed that powdered or ground material which is liable to cake in a hopper may be thoroughly agitated and thus caused to flow easily and at an even rate of speed through an outlet at the bottom of the hopper.

Another object of the invention is to provide agitating means consisting of companion members mounted one in a hopper and the other in a bin or equivalent compartment over the hopper, means being provided for transmitting motion from one agitator to the other and the two agitators thus caused to be actuated at the same time and the ground or powdered material thus kept thoroughly agitated and prevented from failing to flow freely due to caking in either the hopper or the bin.

Another object of the invention is the provision of agitating mechanism wherein a single drive means is required, thus reducing the cost of manufacture and also simplifying the construction and reducing the number of parts.

The invention is illustrated in the accompanying drawing, wherein

Figure 1 is a view of the improved hopper and agitating mechanism shown partially in side elevation and partially in vertical section.

Figure 2 is a sectional view taken along the line 2—2 of Figure 1.

Figure 3 is a sectional view taken along the line 3—3 of Figure 2.

Figure 4 is a view illustrating a modified construction.

The hopper 1 has been shown at one end of the casing 2 of a scale and may be of the specific construction illustrated in the copending application referred to above or of any other desired construction wherein the flour or other ground material is to be delivered onto a conveyor 3 and transported through the casing over weighing mechanism therein. The hopper is of substantially cylindrical formation and disposed transversely of the casing, a discharge opening 4 being formed in the bottom of the hopper and a gate 5 for this opening being mounted under the hopper. The gate is slidably mounted for movement into and out of closing relation to the discharge opening and in order to shift the gate there has been provided a shaft 6 carrying a pinion 7 or a plurality of pinions, each of which meshes with a rack 8 carried by the gate. The shaft projects from one side of the casing and any desired means may be provided for manually rotating the shaft and causing the gate to be moved into or out of closing relation to the discharge opening.

The flour or other ground material is fed from a bin or other container 9 into the hopper through registering openings or passages of the bin and hopper as shown in Figure 1 and it should be noted that walls of the bin converge downwardly so that the material will be directed towards the entrance of the hopper. This powdered or ground material has a tendency to cake in the lower portion of the bin and also within the hopper and in order to break up the caked material and cause it to pass easily from the bin into the hopper and then flow at a steady rate from the hopper through the outlet 4 and down upon the conveyor 3, there have been provided an upper agitator 10 and a lower agitator 11, the agitator 10 being located in the bin and the agitator 11 in the hopper. These agitators both operate at the same time and cause the material to flow very freely during operation of the scale.

The agitator 11 which is mounted in the hopper has a shaft 12 which extends through the hopper axially thereof and has its end portions journaled through bearings 13, as shown in Figures 3 and 4, and projecting from the hopper at opposite sides or ends thereof. A hollow hood or drum 14 which is of arcuate or segmental form in cross section is formed with bearing sleeves 15 at its ends which fit about and are keyed to the shaft 12 and a cover 16 which is formed with a shaft receiving portion 17 is secured in covering relation to the hood or drum by screws or equivalent fasteners 18. When so mounted the cover serves to prevent the ground or powdered material from accumulating in the hood and, in addition, the cover provides flat surfaces extending from the shaft engaging portion 12 radially thereof and adapted to act upon the material when the drum is rocked. Teeth 19 are carried by the drum and may be either pins, as shown in Figures 1, 2 and 3, or flat blades, as shown in Figure 4, where the teeth are indicated by the numeral 19'. The teeth are arranged in rows extending longitudinally of the hood with the teeth of each row in staggered relation to teeth of adjoining rows and are of such length that they extend from the hood or drum to adjacent the walls of the hopper. By so forming and arranging the teeth, powdered or ground material in the hopper will be thoroughly agitated and any lumps or caked portions broken up during rocking of the drum and the material will flow freely towards the outlet at the bottom of the hopper. The flat upper faces of the side portions of the cover 16 exert upward and transverse thrust upon the material during rocking of the drum and assist in agitating the material in the upper portion of the hopper.

In order to actuate the agitator 11 and impart rocking movement to it, there has been provided a crank arm or lever 20 which is keyed to one projecting end portion of the shaft 12 and has pivoted to it a link or pitman 21. The other end of the link is pivoted to a crank arm 22 carried by a shaft 23 which is journaled through a support 24 and at its other end carries a pulley 25 about which is trained a belt 26 for transmitting rotary motion to the shaft from a suitable source of power.

The upper agitator 10 which is mounted in the bin 9 has a shaft 27 journaled through opposed walls of the bin and within the bin this shaft carries teeth 28 in the form of rods secured to and extending radially from the shaft so that when the shaft is turned the teeth will act upon the powdered or ground material in the bin and thoroughly agitate it so that it will flow freely from the bin into the hopper. One end of the shaft 27 projects from the side wall of the bin and carries a crank arm 29 to which is pivoted the upper end of a link or pitman 30. The lower end of the link 30 is pivoted to a crank arm 31 fixed to the shaft 12 at the opposite end thereof from the crank arm 20, and from an inspection of Figure 1 it will be seen that during rocking of the shaft 12 rocking motion will be transmitted to the shaft 27. Therefore, the two agitators will be operated at the same time and both receive their motion from the shaft 23.

To relieve the down pressure and weight of the material in the upper bin from resting on the upper side of the agitator and thus causing the agitator to lift the complete load during its operation, also causing a strain on the machine and an overload on the motor. I have provided in the upper end of the hopper 1 converging side walls 32 and 33 which form a throat 34 at least one third less than the diameter of the hopper 1 at its center. This construction forms a narrowed opening in the upper part of the hopper and tends to hold back the load or pressure of the material relieving the agitator 11 and permitting it to operate freely.

Often material will become arced in the bin and when it breaks it falls with considerable force flooding the weighing machine. This condition would be disastrous if it were not for the simple yet effective design of the hopper 1 used in combination with the agitator 11. The throat being narrowed by the sidewalls 32 and 33 directs all material entering the hopper to first contact the upper side or plate 16 of the agitator 11, thus when the combined agitator and its pins are not in motion they form a closure and prevent the material from passing through the machine until it is again agitated by the rocking operation.

I have, therefore, provided a hopper arranged to receive powdered or ground material from a bin under which a hopper is mounted and provided in the hopper and the bin improved agitating means for breaking up the material in case it should form lumps or become packed in the bin or hopper.

Having thus described the invention, what is claimed as new is:

1. In a structure of the character described, a hopper having an inlet at its top and an outlet at its bottom, a rocker shaft extending horizontally in said hopper and journaled through walls of the hopper, a hollow drum suspended from said shaft having heads at its ends fixed to the shaft to suspend the drum from the shaft, elongated teeth extending outwardly from said drum towards walls of the hopper and terminating adjacent walls of the hopper, a removable cover for said drum having a ridge straddling the shaft between heads of the drum and flat side portions for closing the drum extending from opposite sides of the ridge and secured along marginal edges of walls of the drum in closing relation to the drum, and means for imparting rocking movement to said shaft.

2. In a structure of the character described, a hopper having an outlet at its bottom, a rocker shaft extending horizontally in said hopper and journaled through walls thereof, a hollow drum suspended from said shaft within said hopper and having an arcuate wall, a cover for said drum having flat portions extending between opposite sides of the shaft and marginal edges of the arcuate wall, teeth radiating from the arcuate wall and terminating adjacent walls of the hopper, and means for imparting rocking motion to said shaft.

3. In a structure of the character described, a substantially cylindrical hopper extending horizontally and having end walls and an annular wall between the end walls constituting the bottom and side walls of the hopper, said hopper having an inlet at its top and an outlet at its bottom, a rocker shaft extending horizontally in said hopper over the outlet and journaled through the end walls of the hopper, and agitating means suspended from said shaft within the hopper and extending longitudinally therein between end walls of the hopper and having an annular wall disposed in spaced and substantially parallel relation to the annular wall of the hopper and upper transversely sloping walls at opposite sides of the shaft for exerting upward thrust during rocking movement of the agitator, and teeth extending outwardly from the annular wall of the agitator and terminating adjacent the annular wall of the hopper.

GLEN G. MERCHEN.